(12) United States Patent
Zhao et al.

(10) Patent No.: US 9,045,132 B1
(45) Date of Patent: Jun. 2, 2015

(54) SYSTEM AND METHOD FOR ENGINE IDLE STOP CONTROL WITH STARTER MOTOR PROTECTION

(71) Applicant: FORD GLOBAL TECHNOLOGIES, LLC, Dearborn, MI (US)

(72) Inventors: Yanan Zhao, Ann Arbor, MI (US); Sangeetha Sangameswaran, Canton, MI (US); Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 14/133,738

(22) Filed: Dec. 19, 2013

(51) Int. Cl.
  *B60L 9/00* (2006.01)
  *B60W 20/00* (2006.01)
  *F02D 28/00* (2006.01)
  *F02D 29/02* (2006.01)
  *F02N 11/08* (2006.01)

(52) U.S. Cl.
  CPC ............... *B60W 20/00* (2013.01); *F02D 28/00* (2013.01); *F02D 29/02* (2013.01); *Y10S 903/903* (2013.01); *F02N 11/0855* (2013.01); *F02N 11/0825* (2013.01)

(58) Field of Classification Search
  USPC ......................................................... 701/22
  See application file for complete search history.

(56) References Cited

U.S. PATENT DOCUMENTS

| 6,055,141 | A * | 4/2000 | Dorschky et al. | 361/25 |
| 6,809,428 | B1 * | 10/2004 | Blackburn et al. | 290/37 R |
| 2009/0200098 | A1 * | 8/2009 | Inoue et al. | 180/446 |
| 2009/0299549 | A1 | 12/2009 | Albertson | |
| 2010/0057323 | A1 * | 3/2010 | Jourdes | 701/101 |
| 2010/0145562 | A1 | 6/2010 | Moran | |
| 2010/0191446 | A1 | 7/2010 | McDonald et al. | |
| 2011/0005486 | A1 | 1/2011 | Nakamura | |
| 2011/0132307 | A1 * | 6/2011 | Patterson et al. | 123/179.3 |
| 2011/0153119 | A1 | 6/2011 | Lee et al. | |
| 2011/0153141 | A1 | 6/2011 | Beechie et al. | |
| 2011/0174255 | A1 | 7/2011 | Neuburger et al. | |
| 2012/0191329 | A1 * | 7/2012 | Roessle et al. | 701/113 |

FOREIGN PATENT DOCUMENTS

| JP | 2004132333 A | 4/2004 |
| JP | 2009030571 A | 2/2009 |

OTHER PUBLICATIONS

O. Appelkvist, et al. Route Predictive Optimization of State-of-Charge Reference Signal, Sep. 2010, Goteborg, Sweden.

* cited by examiner

*Primary Examiner* — Hussein A. Elchanti
(74) *Attorney, Agent, or Firm* — Brooks Kushman P.C.

(57) ABSTRACT

A system and method for controlling engine idle stop in a hybrid vehicle that uses predictive information to schedule engine stops with relatively longer stop duration time to gain more fuel savings and extend life of starter motor. More specifically, predictive information may be used to determine potential vehicle stop events, along with corresponding stop duration times, within a time window. An engine stop scheduler and/or controller may be configured to schedule stops of longer duration for optimal total engine stop time. Similarly, taking into account constraints imposed by the thermal limits of the motor, engine stop may be inhibited for predicted short events to allow engine stop at later longer stop events.

15 Claims, 7 Drawing Sheets

SYSTEM AND METHOD FOR ENGINE IDLE STOP CONTROL WITH STARTER MOTOR PROTECTION

TECHNICAL FIELD

The present disclosure relates to vehicles with an engine auto-stop feature and controlling engine idle stop and restart activities with starter motor protection.

BACKGROUND

A hybrid vehicle may be equipped with an engine auto-stop system. An engine auto-stop system shuts down the engine during certain periods of vehicle operation to conserve fuel. For example, engine auto-stop may be engaged when the vehicle is stopped at a traffic light or in a traffic jam rather than permitting the engine to idle. The engine may be restarted when the driver releases the brake or actuates the accelerator pedal. The engine may also be started, for example, due to loads on the electrical system. Stopping the engine when it is not needed improves fuel economy and reduces emissions.

Engine auto-stop systems may also pose various challenges. For example, frequent engine stop/start events can cause driver discomfort and starter motor overheating. To prevent excessive engine stop and starter motor overheating, the total number of stop/start events occurring within a time window, along with the starter motor heat accumulated from restarting the engine during the stop/start events, is monitored. Engine stop may be inhibited once an engine stop and/or starter motor heat threshold is reached. In the existing design of engine stop scheduling, the engine stop is inhibited once a limit associated with the number of engine stops permitted within a specified time window is reached and/or a heat threshold is reached.

SUMMARY

A system and method for controlling engine idle stop in a hybrid vehicle that uses predictive information to schedule engine stops with relatively longer stop duration time to gain more fuel savings and extend starter motor life is disclosed. More specifically, predictive information may be used to determine potential vehicle stop events within a time window. An engine stop scheduler and/or controller may then schedule stops of relatively longer duration for optimal total engine stop time. Similarly, taking into account constraints imposed by the thermal limits of the motor, engine stop may be inhibited for predicted short stops to facilitate engine stop at later longer vehicle stop events.

In one embodiment, a hybrid vehicle includes an engine, a starter motor and a controller. The controller is configured to inhibit engine stop during a vehicle stop event in response to a starter motor heat, associated with restarting the engine during vehicle stop events, exceeding a corresponding heat threshold within a time window, and a predicted vehicle stop duration of the vehicle stop event being less than other vehicle stop events within the time window. The total predicted starter motor heat may be based on at least one of a starter motor current, a starter motor internal resistance, the predicted vehicle stop duration, and a total number of vehicle stop events predicted within the time window. Moreover, the vehicle stop events predicted within the time window may be determined from a predicted vehicle stop profile generated using predictive information.

In another embodiment, a method for controlling a hybrid vehicle having a starter motor and an engine includes controlling engine stop during a vehicle stop event, based on a predicted vehicle stop duration relative to other vehicle stop events within a time window, when a predicted starter motor heat within the time window exceeds a starter motor heat threshold. The method also includes initiating engine stop during the vehicle stop event in response to the predicted vehicle stop duration being greater than other vehicle stop events within the time window and the predicted starter motor heat within the time window exceeding the starter motor heat threshold.

In yet another embodiment, a method for control of a hybrid vehicle having an engine and starter motor includes controlling engine stop during a vehicle stop event, based on a predicted vehicle stop duration relative to other vehicle stop events within a time window, when a total number of vehicle stop events predicted within the time window exceeds a corresponding engine stop threshold. The method also includes inhibiting engine stop during the vehicle stop event in response to the predicted vehicle stop duration being less than other vehicle stop events within the time window and the total number of vehicle stop events predicted within the time window exceeding the corresponding engine stop threshold. The vehicle stop events may correspond to engine idle conditions, wherein engine idle conditions may include a vehicle speed being below a minimum speed threshold and a brake pedal being engaged.

Embodiments according to the present disclosure provide various advantages. For example, various embodiments reduce driver discomfort and starter motor overheat that may result from frequent engine stop/start events. These advantages are achieved by limiting the total number of engine stop/start events within a time window and by inhibiting engine stop when starter motor heat exceeds a heat threshold. Moreover, use of the operating strategies presently disclosed improves fuel economy through selective engine idle stop control, and specifically, through selection of engine stops with longer durations.

The above advantages and other advantages and features will be readily apparent from the following detailed description of the preferred embodiments when taken in connection with the accompanying drawings.

DETAILED DESCRIPTION

As required, detailed embodiments of the claimed subject matter are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

A hybrid vehicle may be equipped with an engine auto-stop system. An engine auto-stop system shuts down the engine during certain periods of vehicle operation to conserve fuel. For example, the auto-stop system may shut the engine off during engine idle conditions where the engine is not required for propulsion or other purposes. The auto-stop system may then restart the engine when required for propulsion or other purposes. By disabling the engine when possible, overall fuel consumption is reduced. However, unlike true hybrid vehicles, vehicles with an auto-stop feature are not capable of pure electric propulsion and are not equipped with a traction battery, but rather with a conventional starting, lighting, and ignition (SLI) battery.

Figure 1:
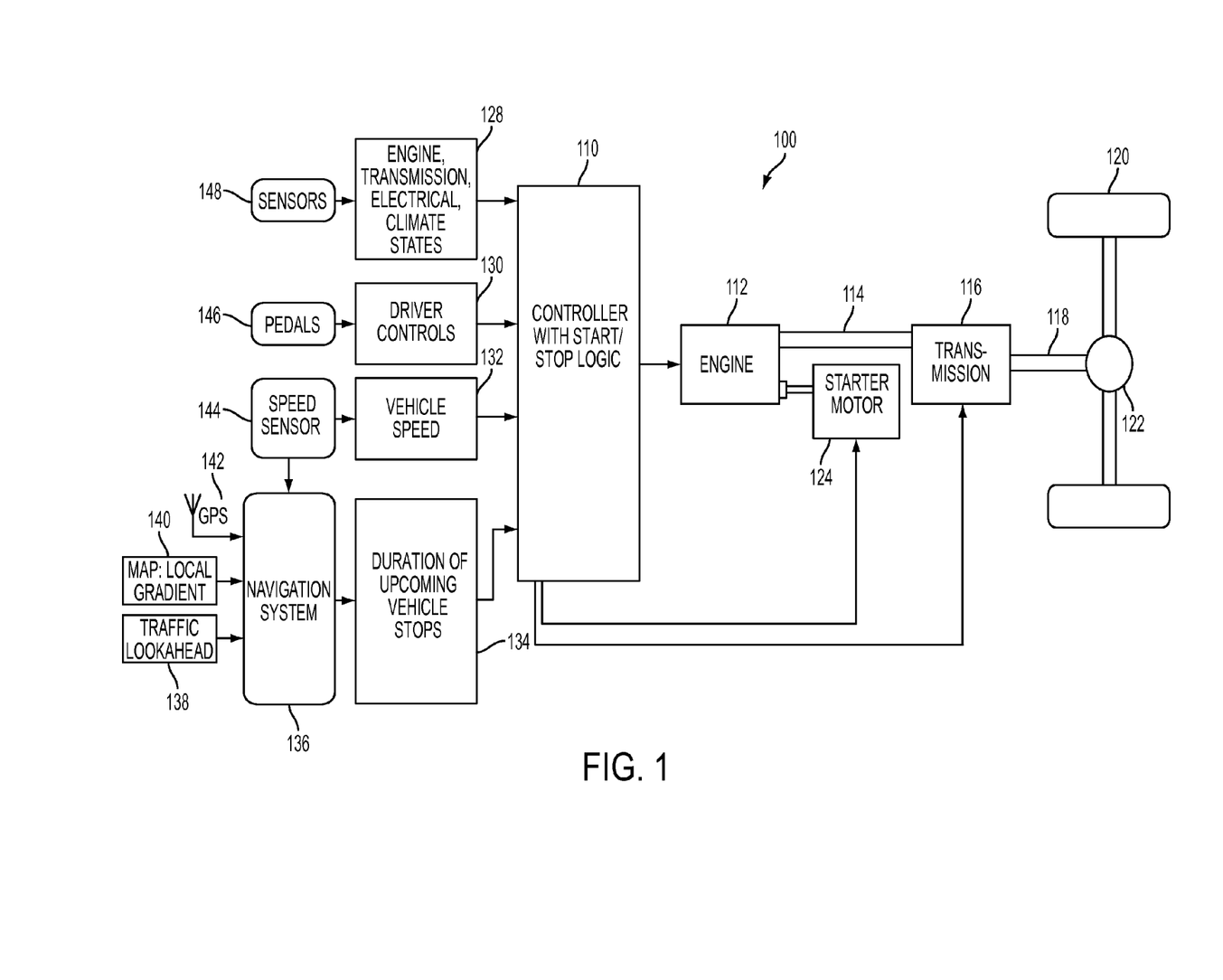
FIG. 1 is a schematic representation of a powertrain system configuration capable of implementing embodiments of the present disclosure.

Referring to FIG. 1, a schematic representation of a vehicle powertrain configuration 100 having auto-stop functionality that is capable of implementing the control strategies disclosed herein is shown. A vehicle control system, shown generally as controller 110, may be provided to control various components and subsystems of the vehicle, and include appropriate start/stop logic and/or controls for controlling an engine auto-stop system. Controller 110 may generally include any number of microprocessors, ASICs, ICs, memory (e.g., FLASH, ROM, RAM, EPROM and/or EEPROM) and software code that cooperate with one another to perform a series of operations. The controller 110 may communicate with other controllers over a vehicle-wide network, such as a controller area network (CAN). The CAN may be a hardline vehicle connection (e.g., bus) and may be implemented using any number of communication protocols generally known.

Controller 110 may be configured to initiate an auto-stop or auto-start of the engine 112 during various operating conditions. As the vehicle comes to a stop, for example, controller 110 may issue a command to begin the process to stop the engine 112, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controller may issue a command to begin the process to start the engine, thus enabling the alternator or integrated starter generator to provide electric current to the electrical loads.

In general, controller 110 receives input from various vehicle sensors 148 that indicate engine, transmission, electrical and climate states 128. The vehicle speed 132 is also communicated to controller 110 through speed sensor 144. The controller 110 further receives input from driver controls 130, such as the accelerator and brake pedals 146, and a navigation system 136 that provides information to predict and determine durations of upcoming vehicle stop events 134. The navigation system 136 may receive information from the vehicle speed sensor 144, GPS 142, local gradient maps and sensors 140, and/or traffic flow data 138. In one configuration, the navigation system 136 may be an in-vehicle GPS system. In another configuration, the navigation system 136 may comprise a location-enabled mobile device, such as a cellular phone or standalone GPS unit. Other configurations are, of course, also possible. The controller 110 may generally implement engine stop and start, with one or more of the additional features provided by embodiments of the disclosure as described in further detail below.

With continual reference to FIG. 1, an internal combustion engine 112, controlled by controller 110, distributes torque through torque input shaft 114 to transmission 116. The transmission 116 includes a torque output shaft 118 drivably connected to vehicle traction wheels 120 through a differential and axle mechanism 122. A starter motor 124 is provided that is capable of restarting the engine during start/stop events. Other aspects of the powertrain system 100 illustrated in FIG. 1 may be implemented in a known fashion as is appreciated by those skilled in the art. Further, embodiments of the present disclosure are not limited to the particular illustrated powertrain configuration.

As previously discussed, implementing engine auto-stop control strategies may pose various challenges. For example, frequent engine stop/start events can cause driver discomfort and starter motor overheat. To prevent excessive engine stop and/or starter motor overheat, the total number of start/stop events during a time window, along with the starter motor heat accumulated during the start/stop events, is monitored, and engine stop may be selectively inhibited for vehicle stop events having a predicted short duration relative to vehicle stops with a longer duration.

Predictive information may be used to selectively schedule engine stop during vehicle stops with relatively longer duration. More specifically, predictive information may be used to generate a predicted vehicle stop profile from which potential vehicle stop events, along with corresponding vehicle stop duration times, may be determined and/or predicted during a time window. Using these control strategies, the controller may be configured to select stops of longer duration for optimal fuel savings. Similarly, taking into account constraints imposed by the thermal limits of the motor, the controller may also be configured to inhibit engine stop for predicted short events in order to allow engine stop during later vehicle stop events having a longer duration.

Figure 2:
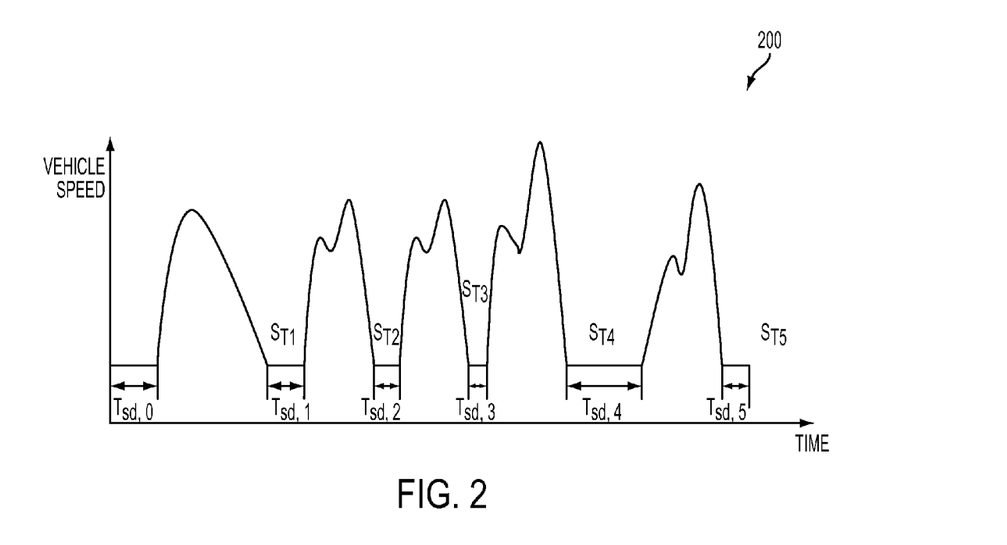
FIG. 2 illustrates a predicted vehicle stop profile in accordance with embodiments of the present disclosure.

The predictability of vehicle stop duration times has improved due to the development and deployment of technologies such as Global Positioning Systems (GPS), Geographic Information Systems (GIS), Vehicle-to-Vehicle (V2V) Communications, Vehicle-to-Infrastructure (V2I) Communications, and traffic flow monitoring systems. Once an intended route is available, a predicted vehicle stop profile can be constructed based on map data, road attributes, real-time and historic traffic information, and/or past driving history of the driver. FIG. 2, for example, illustrates an example predicted vehicle stop profile 200 that shows a set of vehicle stop duration times ($T_{sd,1}$, $T_{sd,2}$, $T_{sd,3}$, $T_{sd,4}$, $T_{sd,5}$) corresponding to a set of predicted vehicle stop events ($S_{T1}$, $S_{T2}$, $S_{T3}$, $S_{T4}$, $S_{T5}$) within a time window.

Figure 3:
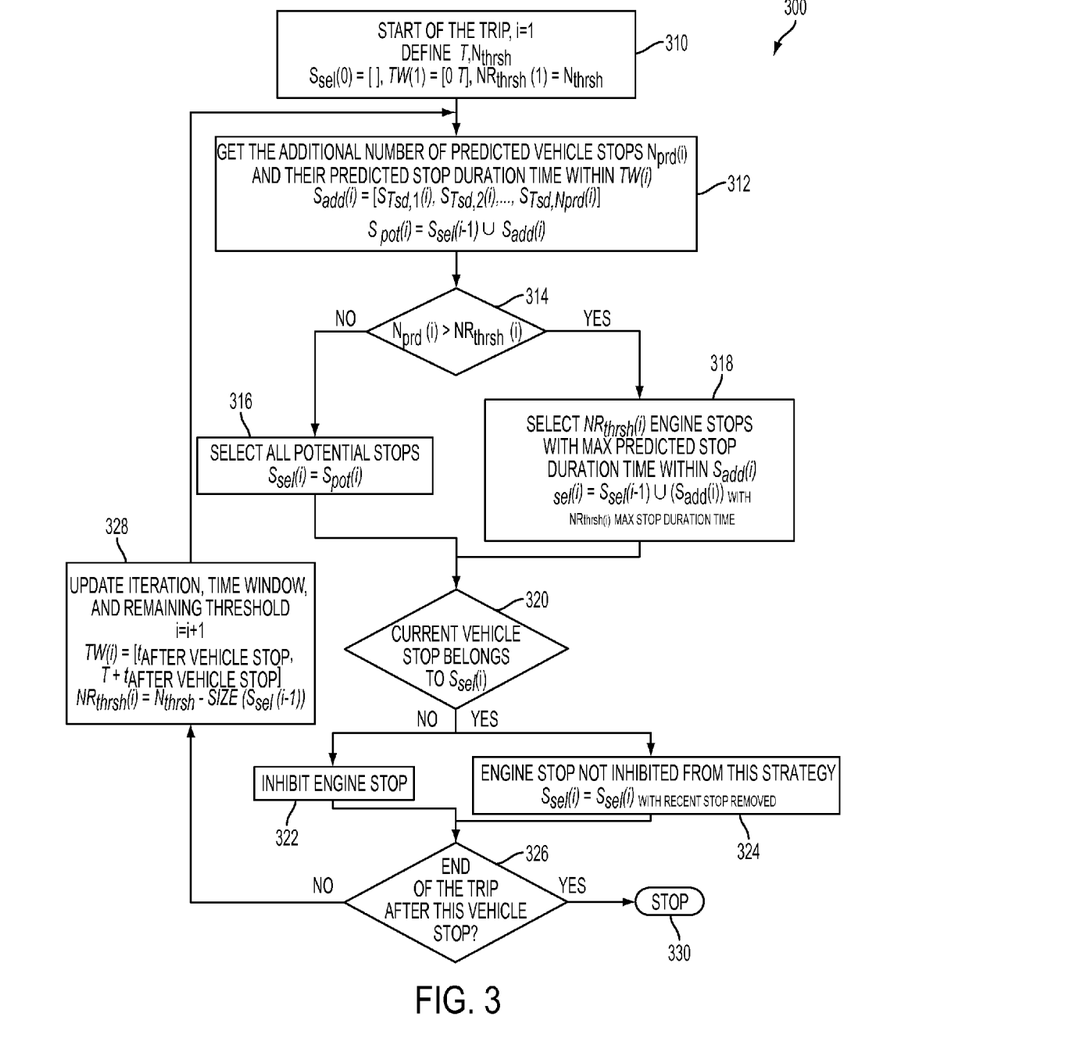
FIG. 3 is a flowchart showing a control sequence for an engine start/stop strategy according to an exemplary embodiment of the present disclosure.

Referring to FIG. 3, operation of a system or method for controlling engine stop/start events of a vehicle according to one embodiment of this disclosure is shown. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, although not explicitly illustrated. In one embodiment, the functions illustrated are primarily implemented by software, instructions, or code stored in a computer readable storage medium and executed by one or more microprocessor-based computers or controllers to control operation of the vehicle.

As shown in FIG. 3, the control strategy 300 begins at block 310 where a first counter (i), which represents the iteration number, is initiated and the method is conducted iteratively from the start of the trip until the end of the trip. At block 310, the parameters associated with a predefined time window (T) over which to monitor vehicle stops (where the time window being monitored is rolling) and a threshold value ($N_{thrsh}$) corresponding to the total number of engine stops permitted within the specified time window (T) are defined. In addition, the following parameters are defined and initiated at block 310: TW(i), which represents the time window at the current iteration (TW(i)=[current time, T+current time]); $S_{sel}(i)$, which represents the set of selected engine stops at the current iteration and it is empty at the start of the trip ($S_{sel}$=[ ]); and the threshold $NR_{thrsh}(i)$, which represents the remaining number of engine stops permitted and is the difference between the total number of permitted engine stops ($N_{thrsh}$) within the time window (T) and the number of selected engine stops remaining in the set $S_{sel}(i-1)$.

Continuing on to block 312, the control strategy determines the additional number of predicted vehicle stops ($N_{prd}(i)$) when the vehicle enters the current time window, TW(i), and it also determines the corresponding duration of each newly predicted vehicle stop that is stored as a set of values represented by $S_{add}(i)$. In addition, the set of all potential engine stops ($S_{pot}(i)$) within the current time window (TW(i)) is determined at block 312 by combining the set of selected engine stops remaining from the previous iteration ($S_{sel}(i-1)$) with the set of newly predicted stops ($S_{add}(i)$) at the current iteration (i.e., $S_{pot}(i)=S_{sel}(i-1)$ combined with $S_{add}(i)$). At block 314, the additional number of predicted vehicle stops ($N_{prd}(i)$) is compared with the threshold $NR_{thrsh}(i)$ corresponding with the remaining number of engine stops permitted ($NR_{thrsh}(i)=N_{thrsh}-size(S_{sel}(i-1))$). If the additional number of predicted vehicle stops ($N_{prd}(i)$) within the current iteration is below or equal to the threshold ($NR_{thrsh}(i)$) of remaining number of engine stops permitted at block 314, then the new set of selected/scheduled engine stops ($S_{pot}(i)$) for the current iteration and time window (TW(i)) is the same as the set of all potential engine stops ($S_{pot}(i)$) determined from combining $S_{sel}(i-1)$ with $S_{add}(i)$), as shown in block 316. When the additional number of predicted vehicle stops ($N_{prd}(i)$) exceeds the threshold ($NR_{thrsh}(i)$) of remaining number of engine stops permitted at block 314, the control strategy selects $NR_{thrsh}(i)$) number of stops from set $S_{add}(i)$ that have the maximum stop duration time and this selection is combined with $S_{sel}(i-1)$ to become new set $S_{sel}(i)$, as is shown at block 318.

In the event that two or more vehicle stop events within the time window have equal predicted vehicle stop duration times, the controller may be configured to select the first event scheduled to occur in the time window. Moreover, the predicted stop duration of the first vehicle stop event may be more certain because predictive information is dynamic.

With continual reference to FIG. 3, the control strategy determines whether the current vehicle stop is a part of the selected/scheduled stops as defined in $S_{sel}(i)$, which represents the current set of selected/scheduled engine stops for the current iteration and time window, as shown in block 320. If the current stop is not within the set of selected/scheduled stops $S_{sel}(i)$, then the controller inhibits the engine from shutting down, as depicted in block 322. In contrast, if the current vehicle stop is within set of selected/scheduled stops $S_{sel}(i)$, then the controller does not prevent the engine from shutting down at the current vehicle stop, as shown in block 324. In addition, at block 324, the set $S_{sel}(i)$ is updated by removing the recent stop from the stored set of scheduled stops.

The control strategy then moves on to block 326, where it determines whether the trip is over after the current stop. If the trip ends after the current vehicle stop, then the control strategy ends at 330. If not, the control strategy continues to block 328 where the first counter is incremented and the time window (TW(i)) and the threshold ($NR_{thrsh}$) are updated for the new iteration. The control strategy then completes steps 312 through 328 until the trip is completed.

Figure 4A:
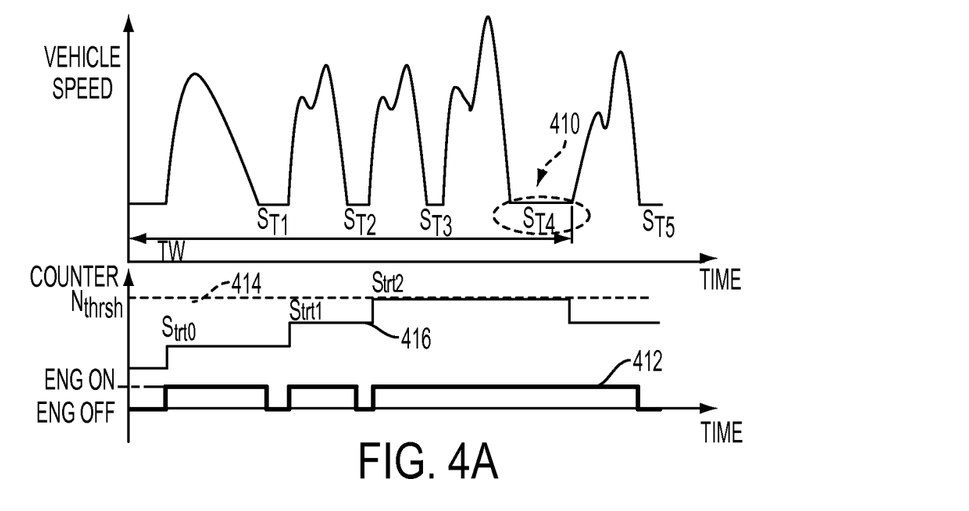
FIGS. 4A and 4B illustrate a plot of an engine start/stop sequence with and without the use of predictive information in accordance with embodiments of the present disclosure.
Figure 4B:
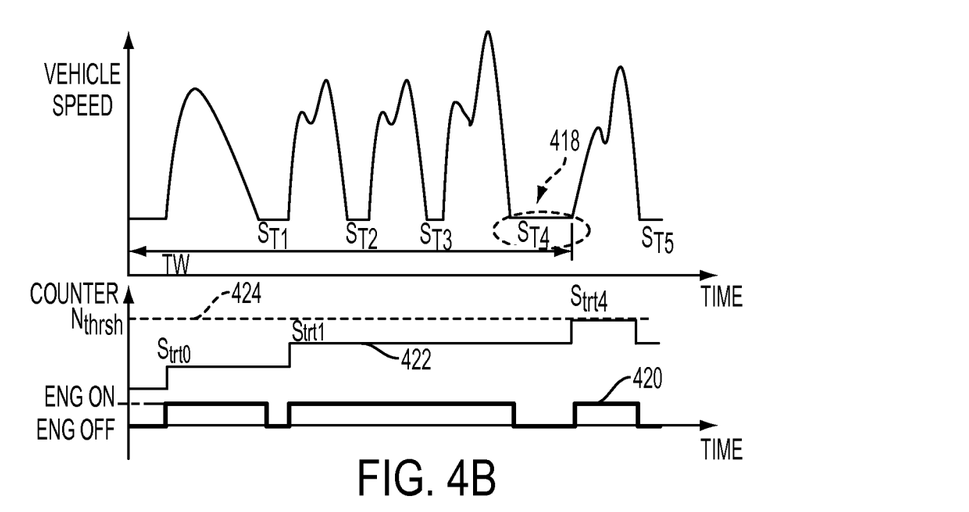

FIGS. 4A and 4B illustrate a predicted vehicle stop profile 400 showing the effectiveness of using the above-described control strategy to facilitate selective engine idle stop with the aid of predictive information. For example, FIG. 4A demonstrates that without the use of predictive information in the control strategy disclosed above, the engine stop will be scheduled during vehicle stops $S_{T1}$ and $S_{T2}$, after that the starter counter 416 reaches the threshold ($N_{thrsh}$) 414 of the number of engine stops permitted. This can be seen from engine on/off line 412, as well. Without the use of predictive information to selectively schedule engine stop, engine stop is inhibited during vehicle stop $S_{T4}$ 410, which has the longest stop duration time relative to other vehicle stop events within the time window. Whereas, FIG. 4B shows that when the control strategy disclosed above is used, the controller will inhibit engine stop (engine remains on) during $S_{T2}$ (this can be seen from engine on/off line 420), so as to facilitate engine stop during $S_{T4}$ (the longest stop duration time) 418. The starter counter 422 reaches the threshold $N_{thrsh}$ 424 after stopping the engine during the longest vehicle stop 418. As is clearly shown, the control strategy disclosed herewith provides more fuel savings by selecting engine stops with longer stop duration time.

As mentioned above, an additional challenge imposed by stop/start vehicles relates to starter motor overheating. The heat of a starter motor is generated during engine cranking, and it is dissipated after the cranking is completed. The heat of a starter motor can be modeled with Equation (1), where Q is the heat, k is the integration step, I is the starter motor current, Rm is the motor internal resistance including armature and brush, Tc is the heat dissipation time constant, and dt is the sampling rate.

$$Q_{k+1}=Q_k+(I^2R_m-Q_k/T_c)dt \qquad (1)$$

Figure 5:
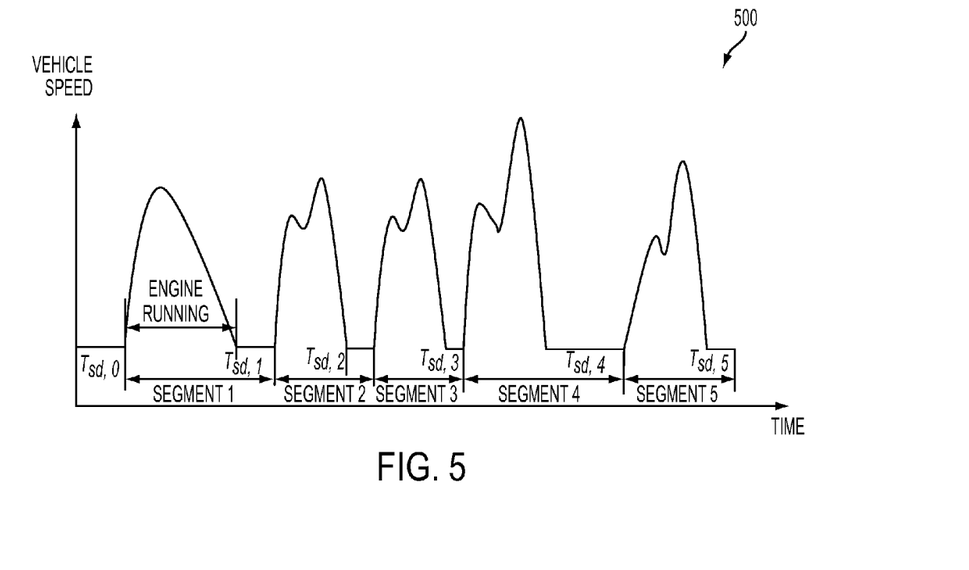
FIG. 5 illustrates an example predicted vehicle stop profile considering starter motor heat in accordance with embodiments of the present disclosure.

Using Equation (1), the heat of the starter motor is accumulated during a series of engine restart events. To prevent overheat, a threshold value ($Q_{thrsh}$) is defined and above which the engine stop is inhibited. FIG. 5, for example, illustrates an example predicted vehicle stop profile 500 that shows a set of vehicle stop duration ($T_{sd,1}$, $T_{sd,2}$, $T_{sd,3}$, $T_{sd,4}$, $T_{sd,5}$) corresponding to vehicle stop events predicted within a time window that is used to determine and/or predict starter motor heat. In FIG. 5, the time window is decomposed into a series of segments where each starts right before a vehicle start, and ends right before the next vehicle start. Let's say, for example, the engine is restarted within each segment, and the accumulated starter motor heat along each segment within the time window is $Q_{prd}(j)$, where j=1, 2, . . . , $M_{prd}$, and $M_{prd}$ is the total number of predicted vehicle stops in the time window. Then the total accumulated starter motor heat within the time window is $$\sum_{j=1}^{M_{prd}} Q_{prd}(j).$$

Now, assuming that the time window is rolling, and each has fixed time duration $T_H$. Let i represent the iteration number of the current time window, where $Q(i-1)$ represents the starter motor heat at the end of the previous time window, then the total starter motor heat at the end of the current time window becomes $$Q(i) = Q(i-1) + \sum_{j=1}^{M_{prd}(i)} Q_{prd}(j),$$

where $M_{prd}(i)$ is the number of predicted vehicle stops in the current time window.

Figure 6:
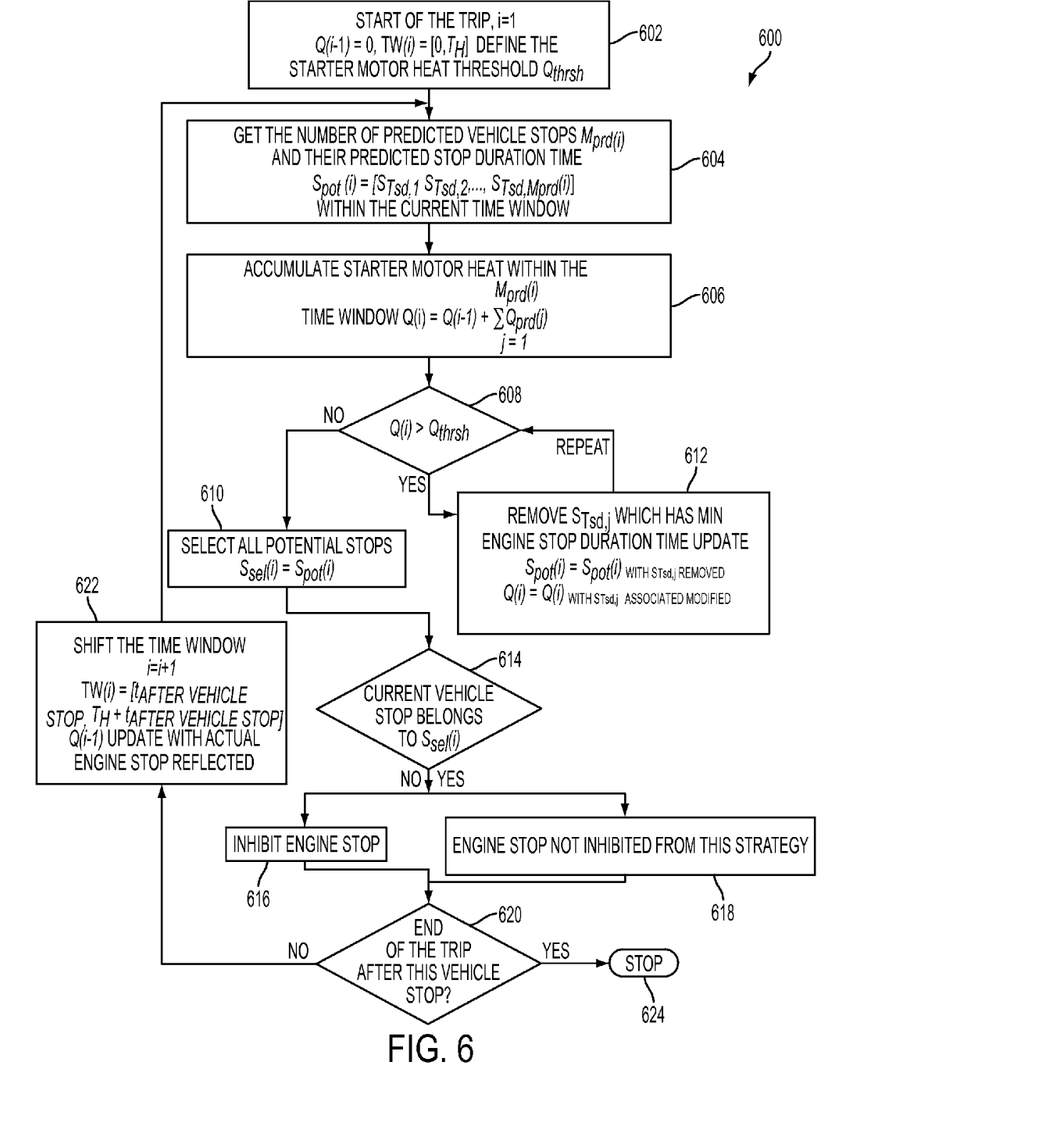
FIG. 6 is a flowchart showing a control sequence for an engine start/stop strategy considering starter motor heat according to yet another embodiment of the present disclosure.

Referring to FIG. 6, operation of a system or method for controlling engine stop/start events of a vehicle to prevent starter motor overheat, according to yet another embodiment of this disclosure, is shown. Specifically, FIG. 6 illustrates a method to select engine stops based on the predicted starter motor heat, where $S_{sel}$ represents the set of the selected engine/vehicle stops, and $S_{pot}$ represents the set of potential engine stops. As shown, when $Q(i)>Q_{thrsh}$, the vehicle stop with the minimum stop duration time inside of the time window will be taken out from the set of potential engine stops. This action is repeated until the predicted starter motor heat does not exceed the corresponding heat threshold.

As shown in FIG. 6, the control strategy 600 begins at block 602 where a first counter (i), which represents the iteration number of the current time window, is initiated and the method is conducted iteratively from the start of the trip until the end of the trip. At block 602, the starter motor heat threshold $Q_{thrsh}$ and the fixed time duration $T_H$ of each look ahead horizon and/or time window are defined. In addition, the following parameters are defined at block 602: TW(i), which represents the time window at the current iteration (TW(i)= [current time, $T_H$+current time]); and $Q_{sel}(i-1)$, which represents the starter motor heat at the end of the previous time window and iteration, which is zero at the start of the trip.

Continuing on to block 604, the control strategy determines the additional number of predicted vehicle stops ($M_{prd}(i)$) when the vehicle enters the current time window, TW(i), and the corresponding duration of each newly predicted stop, which is stored as a set of values represented by $S_{pot}(i)=[S_{Tsd,1}, S_{Tsd,2}, \ldots, S_{Tsd,Mprd(i)}]$. At block 606, the starter motor heat ($Q(i)$) within the time window is accumulated. The starter motor heat ($Q(i)$) is computed by combining the starter motor heat at the end of the previous time window ($Q(i-1)$) with the total predicted accumulated starter motor heat within the current time window, $$\sum_{j=1}^{M_{prd}(i)} Q_{prd}(j),$$

wherein the total predicted starter motor heat at the end of the current time window becomes $$Q(i) = Q(i-1) + \sum_{j=1}^{M_{prd}(i)} Q_{prd}(j).$$

At block 608, the predicted starter motor heat ($Q(i)$) is compared with the starter motor heat threshold that is not to be exceeded ($Q_{thrsh}$). If $Q(i)$ is below or equal to $Q_{thrsh}$, then the new set of selected/scheduled engine stops ($S_{sel}(i)$) for the current iteration and time window is equal to the set of all potential engine stops ($S_{pot}(i)$), as shown in block 610. When $Q(i)$ exceeds heat threshold $Q_{thrsh}$, the vehicle stop with the minimum stop duration time inside of the time window will be taken out from the set of potential stops, as shown at block 612. This action is repeated until the predicted heat is less than the threshold.

In the event that two or more vehicle stop events within the time window have equal predicted vehicle stop duration times, the controller may be configured to select the first event in the tie scheduled to occur in the time window. Selection of the vehicle stop event that occurs first, when one or more vehicle stop events have equal durations, may allow the starter motor an opportunity to cool down and be more available later on. In addition, as predictive information is dynamic, the predicted stop duration of the first vehicle stop event may be more certain.

With continual reference to FIG. 6, the control strategy determines whether the current vehicle stop is a part of the selected/scheduled stops as defined in $S_{sel}(i)$, which represents the current set of selected/scheduled engine stops for the current iteration and time window, as shown in block 614. If the current stop is not within the set of selected/scheduled stops $S_{sel}(i)$, then the controller inhibits the engine from shutting down, as depicted in block 616. In contrast, if the current vehicle stop is within set of selected/scheduled stops $S_{sel}(i)$, then the controller initiates engine stop during the vehicle stop event, as shown in block 618.

The control strategy then moves on to block 620, where it determines whether the trip is over after the current stop. If the trip ends after the current vehicle stop, then the control strategy ends at 624. If not, the control strategy continues to block 622 where the first counter is incremented and the time window (TW(i)) and the $Q(i-1)$ are updated for the new iteration. Specifically, $Q(i-1)$ is updated to reflect actual starter motor heat accumulated during the previous iteration. The control strategy then completes steps 604 through 622 until the trip is completed.

Figure 7A:
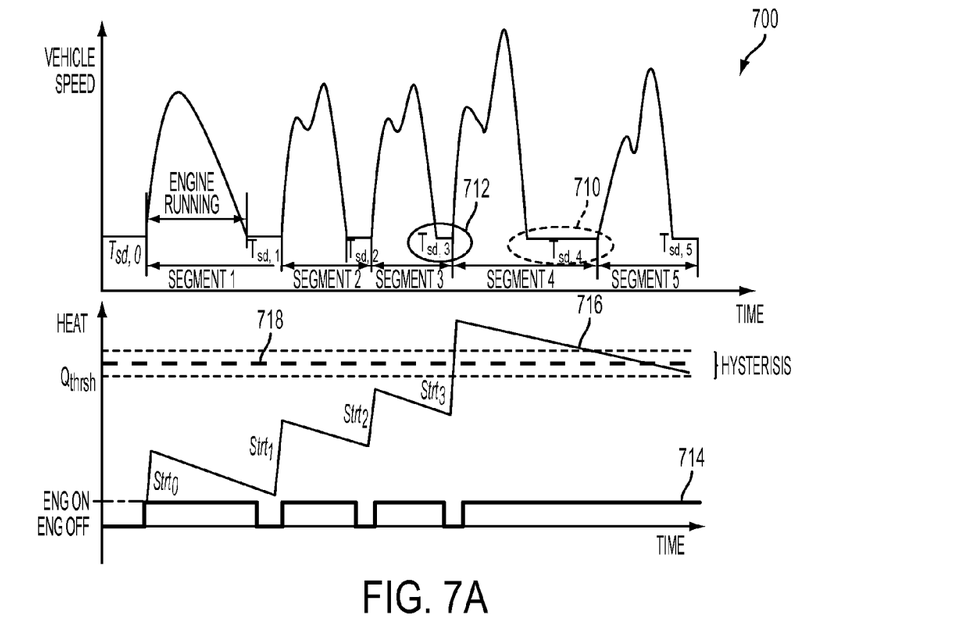
FIGS. 7A and 7B illustrate a plot of an engine start/stop sequence considering starter motor heat, with and without the use of predictive information, in accordance with embodiments of the present disclosure.
Figure 7B:
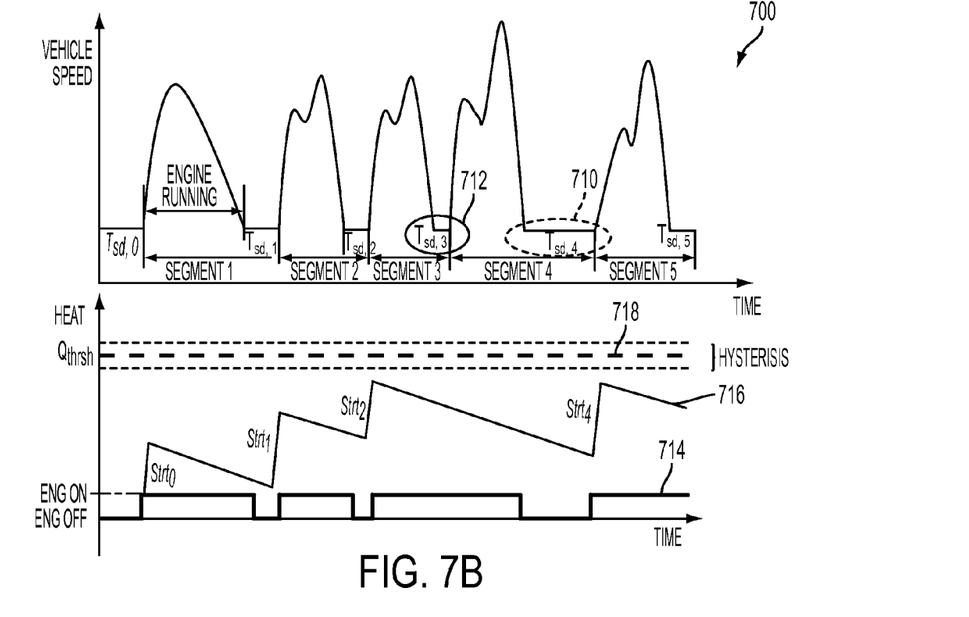

FIGS. 7A and 7B illustrate a predicted vehicle stop profile 700 that shows the effectiveness of using predictive information for engine stop scheduling to prevent starter motor overheat protection and achieve fuel savings. For example, FIG. 7A demonstrates that without the predictive information used in the above control strategy, the engine will be scheduled to stop within segments 1, 2 and 3, and the starter motor heat 716 will reach a corresponding heat threshold 718 during the engine cranking event 714 at $S_{trt3}$. Therefore, the predicted vehicle stop event 710 predicted within segment 4, which has the longest stop duration time is inhibited. Whereas, FIG. 7B demonstrates that when the control strategy disclosed above is used, then the engine stop scheduler will inhibit engine stop 712 within segment 3 (assuming the stop duration time $T_{sd,4}$ is longer than the stop duration time $T_{sd,3}$ as shown), so that engine stop within segment 4 that has a longer stop duration is not inhibited. This not only protects the starter motor from overheat, but also provides more fuel saving by selecting engine stops with longer stop duration time.

As can be seen by the representative embodiments described, embodiments according to the present disclosure help mitigate the challenges posed by stop/start vehicles such as preventing excessive engine stops and/or starter motor overheating. Through use of the disclosed operating strategies, the total number of a series of stop/start events during a time window, along with the starter motor heat accumulated during the stop/start events, is monitored. Through the use of predictive information, the number of vehicle stop events and associated vehicle stop duration times within the time window can be determined and selective engine idle stop can be scheduled within the time window to improve fuel saving, driver comfort and starter motor usage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A hybrid vehicle, comprising:
an engine;
a starter motor configured to start the engine; and
a controller configured to inhibit engine stop during a vehicle stop event in response to a starter motor heat associated with restarting the engine during vehicle stop events exceeding a corresponding heat threshold within a time window, and a predicted vehicle stop duration of the vehicle stop event being less than other vehicle stop events within the time window.

2. The hybrid vehicle of claim 1, wherein the starter motor heat generated within the time window is based on a starter motor current, a starter motor internal resistance, the predicted vehicle stop duration, and a total number of vehicle stop events predicted within the time window.

3. The hybrid vehicle of claim 1, wherein the controller is further configured to shut the engine off during the vehicle stop event in response to the starter motor heat not exceeding the corresponding heat threshold.

4. The hybrid vehicle of claim 1, wherein the vehicle stop events predicted within the time window are determined from a predicted vehicle stop profile generated using predictive information.

5. The hybrid vehicle of claim 4, wherein predictive information includes at least one of map data, road attributes, real-time traffic information, historic traffic information, and past driving history.

6. The hybrid vehicle of claim 1, wherein the vehicle stop events correspond to engine idle conditions, wherein engine idle conditions include a vehicle speed being below a minimum speed threshold and a brake pedal being engaged.

7. The hybrid vehicle of claim 1, wherein the controller is further configured to inhibit engine stop during the vehicle stop event in response to a total number of vehicle stop events predicted within the time window exceeding an engine stop threshold, and the predicted vehicle stop duration being less than other vehicle stop events within the time window.

8. The hybrid vehicle of claim 7, wherein the controller is further configured to shut the engine off during each vehicle stop event predicted within the time window in response to the total number of vehicle stop events not exceeding the engine stop threshold.

9. The hybrid vehicle of claim 7, further comprising:
the controller configured to shut the engine off during the vehicle stop event in response to the total number of vehicle stop events predicted within the time window exceeding the engine stop threshold, and the predicted vehicle stop duration being greater than other vehicle stop events predicted within the time window.

10. The hybrid vehicle of claim 1, wherein vehicle to infrastructure communication and vehicle to vehicle communication are used to predict vehicle stop events associated with at least one of traffic signals, road signs, and traffic congestion.

11. A method for controlling a hybrid vehicle having a starter motor and an engine, comprising:
controlling, using a controller, engine stop during a vehicle stop event based on a predicted vehicle stop duration relative to other vehicle stop events within a time window when a predicted starter motor heat within the time window exceeds a starter motor heat threshold; and
inhibiting engine stop during the vehicle stop event in response to the predicted starter motor heat exceeding the starter motor heat threshold, and the predicted vehicle stop duration being less than other vehicle stop events within the time window.

12. The method of claim 11, wherein the predicted starter motor heat corresponds with the starter motor heat generated within the time window, and is based on a starter motor current, a starter motor internal resistance, the predicted vehicle stop duration, and a total number of vehicle stop events predicted within the time window.

13. The method of claim 11, further comprising:
initiating engine stop during the vehicle stop event in response to the predicted starter motor heat exceeding the starter motor heat threshold, and the predicted vehicle stop duration being greater than other vehicle stop events within the time window.

14. The method of claim 11, wherein the vehicle stop events occurring within the time window are predicted from a predicted vehicle stop profile generated using predictive information, wherein predictive information includes at least one of map data, road attributes, real-time traffic information, historic traffic information, and past driving history.

15. The method of claim 11, wherein the vehicle stop events correspond to engine idle conditions, wherein engine idle conditions include a vehicle speed being below a minimum speed threshold and a brake pedal being engaged.

* * * * *